(12) United States Patent
Mae

(10) Patent No.: US 11,814,294 B2
(45) Date of Patent: Nov. 14, 2023

(54) METHOD OF PRODUCING ANIONICALLY MODIFIED COLLOIDAL SILICA

(71) Applicant: FUJIMI INCORPORATED, Aichi (JP)

(72) Inventor: Ryota Mae, Aichi (JP)

(73) Assignee: FUJIMI INCORPORATED, Aichi (JP)

( * ) Notice: Subject to any disclaimer, the term of this patent is extended or adjusted under 35 U.S.C. 154(b) by 22 days.

(21) Appl. No.: 17/331,728

(22) Filed: May 27, 2021

(65) Prior Publication Data
US 2021/0380419 A1    Dec. 9, 2021

(30) Foreign Application Priority Data
Jun. 5, 2020 (JP) ................. 2020-098159

(51) Int. Cl.
*C01B 33/14* (2006.01)
*C09K 3/14* (2006.01)

(52) U.S. Cl.
CPC ............ *C01B 33/14* (2013.01); *C09K 3/1409* (2013.01); *C09K 3/1436* (2013.01)

(58) Field of Classification Search
CPC ...... C01B 33/14; C09K 3/1409; C09K 3/1436
See application file for complete search history.

(56) References Cited

U.S. PATENT DOCUMENTS

| 10,508,222 B2 | 12/2019 | Mizuno et al. |
| 2013/0146804 A1 | 6/2013 | Mizuno et al. |
| 2018/0244957 A1 | 8/2018 | Mizuno et al. |

FOREIGN PATENT DOCUMENTS

| JP | 2006213541 A | * | 8/2006 |
| JP | 2012040671 A | | 3/2012 |
| JP | 2017068882 A | * | 4/2017 |

* cited by examiner

*Primary Examiner* — Colin W. Slifka
*Assistant Examiner* — Logan Edward Laclair
(74) *Attorney, Agent, or Firm* — Katten Muchin Rosenman LLP

(57) ABSTRACT

There is provided a method of producing anionically modified colloidal silica capable of polishing a silicon nitride film at a high speed and suppressing a polishing speed of a silicon oxide film. A method of producing anionically modified colloidal silica includes ion exchanging raw colloidal silica using an ion exchange resin (ion exchange step); and anionically modifying ion-exchanged raw colloidal silica to obtain anionically modified colloidal silica (modification step).

2 Claims, No Drawings

METHOD OF PRODUCING ANIONICALLY MODIFIED COLLOIDAL SILICA

BACKGROUND

1. Technical Field

The present invention relates to a method of producing anionically modified colloidal silica.

2. Description of Related Arts

In recent years, as LSI (Large Scale Integration) is highly integrated and has high performance, a new microfabrication technique has been developed. Chemical mechanical polishing (CMP) method is one of those techniques and it is often used in an LSI manufacturing process, particularly in planarizing an interlayer insulating film in a multilayer wiring forming process, forming a metal plug, and forming embedded wiring (damascene wiring).

The CMP has been applied to each step in semiconductor manufacturing, and as one aspect thereof, for example, application to a gate formation step in transistor manufacturing can be mentioned. In manufacturing a transistor, materials such as metal, silicon, silicon oxide, polycrystalline silicon, and a silicon nitride film may be polished, and there is a need to polish each material at high speed in order to improve productivity. In order to meet such needs, for example, in order to provide a polishing composition capable of polishing an object to be polished having poor chemical reactivity such as silicon nitride at a high speed, JP 2012-040671 A (US 2013/146804 A) discloses a technique in which a composition includes colloidal silica where an organic acid is immobilized (sulfonic acid group (anionically) modified colloidal silica) and has a pH of 6 or less.

SUMMARY

Indeed, when the anionically modified colloidal silica described in JP 2012-040671 A (US 2013/146804 A) is used, a silicon nitride film can be polished at a high polishing speed.

The inventor has found that it is sometimes preferable in manufacturing that a silicon nitride film is polished at a high polishing speed, whereas the polishing speed for a silicon oxide film is minimized, in CMP in semiconductor manufacturing.

Therefore, an object of the present invention is to provide a method of producing anionically modified colloidal silica capable of polishing a silicon nitride film at a high speed and suppressing a polishing speed of a silicon oxide film.

The inventor has carried out a diligent study to solve the above problems described above. As a result, the inventor has found that the above problems can be solved by performing ion exchange on raw colloidal silica using an ion exchange resin and anionically modifying the ion-exchanged raw colloidal silica to obtain anionically modified colloidal silica, and completed the present invention.

That is, according to one aspect of the present invention, there is provided a method of producing anionically modified colloidal silica which includes: ion exchanging raw colloidal silica using an ion exchange resin (ion exchange step); and anionically modifying ion-exchanged raw colloidal silica to obtain anionically modified colloidal silica (modification step).

DETAILED DESCRIPTION

Embodiments according to one aspect of the present invention are described hereinbelow. The present invention is not limited only to the following embodiments.

As used herein, the expression "X to Y" showing a range represents "X or more and Y or less". Further, unless otherwise indicated, operations and measurements of physical properties and the like are carried out under conditions of room temperature (of 20 to 25° C.) and relative humidity of 40 to 50% RH.

One aspect of the present invention is a method of producing anionically modified colloidal silica which includes: ion exchanging raw colloidal silica using an ion exchange resin (ion exchange step); and anionically modifying ion-exchanged raw colloidal silica to obtain anionically modified colloidal silica (modification step). The ion exchange step and the modification step are performed in combination with each other, so that, in the method of producing anionically modified colloidal silica of this aspect, it is possible to obtain anionically modified colloidal silica capable of polishing a silicon nitride film at a high speed and suppressing a polishing speed of a silicon oxide film.

As used herein, the term "modified colloidal silica" means that an anionic group (e.g., a sulfonic acid group) is bonded to the surface of each colloidal silica particle.

Hereinafter, the production method according to one aspect of the present invention is described in detail.

<Ion Exchange Step>

The production method of this aspect includes ion exchanging ion-exchanged raw colloidal silica using an ion exchange resin (ion exchange step).

The ion exchange step may be performed once, or may be performed two or more times, if necessary.

[Raw Colloidal Silica]

The raw colloidal silica is a raw material before being anionically modified using a modification step described later, and contains silica particles. The raw colloidal silica may be produced by a sodium silicate method or a sol-gel method. The raw colloidal silica may be a synthesized product or a commercially available product. The raw colloidal silica may be unmodified or modified. Examples of the modified raw colloidal silica include modified colloidal silica treated with aluminic acid, and the like.

In the production method of this aspect, aggregation of silica particles can be suppressed regardless of the purity of the raw colloidal silica.

In one embodiment, the raw colloidal silica is colloidal silica obtained by a sodium silicate method. The sodium silicate method is typically a method in which active silicic acid obtained by ion exchange of an aqueous alkali silicate solution such as liquid glass is used as a raw material, and the active silicic acid is subjected to particle growth.

A lower limit of an average primary particle size of the raw colloidal silica is preferably 1 nm or more, more preferably 5 nm or more, and still more preferably 7 nm or more. Further, an upper limit of an average primary particle size of the raw colloidal silica is preferably 100 nm or less, more preferably 50 nm or less, and still more preferably 20 nm or less. When the particle size is within the range, in the polishing composition containing the produced anionically modified colloidal silica, the silicon nitride film can be polished at a high speed, and the polishing speed of the silicon oxide film can be suppressed. The average primary particle size of the colloidal silica is calculated based on, for example, a specific surface area of the colloidal silica measured by a BET method.

A lower limit of an average secondary particle size of the raw colloidal silica is preferably 2 nm or more, more preferably 10 nm or more, and still more preferably nm or more. An upper limit of an average secondary particle size of the raw colloidal silica is preferably 200 nm or less, more preferably 150 nm or less, and still more preferably 100 nm or less. When the particle size is within the range, in the polishing composition containing the produced anionically modified colloidal silica, the silicon nitride film can be polished at a high speed, and the polishing speed of the silicon oxide film can be suppressed. Note that the average secondary particle size of the colloidal silica can be measured by, for example, a dynamic light scattering method represented by a laser diffraction scattering method.

The value of the average degree of association (average secondary particle size/average primary particle size) of the raw colloidal silica is not particularly limited, and is, for example, 1.0 or more and 5.0 or less, preferably 2.5 or more and 5.0 or less, and more preferably 4.0 or more and 5.0 or less. When the value is within the range, in the polishing composition containing the produced anionically modified colloidal silica, the silicon nitride film can be polished at a high speed, and the polishing speed of the silicon oxide film can be suppressed.

The concentration of silica particles (solid content) in the raw colloidal silica is not particularly limited as long as it is a concentration suitable for ion exchange. The concentration of silica particles (solid content) in the raw colloidal silica is, for example, 1% by mass or more and 40% by mass or less, preferably 5% by mass or more and 30% by mass or less, and more preferably 10% by mass or more and 20% by mass or less.

[Ion Exchange Resin]

The ion exchange resin is not particularly limited, and examples thereof include a strongly acidic cation exchange resin, a weakly acidic cation exchange resin, a strongly basic anion exchange resin (type I), a strongly basic anion exchange resin (type II), and a weakly basic anion exchange resin. The ion exchange resin is preferably a strongly acidic cation exchange resin or a weakly acidic cation exchange resin.

Examples of the exchange group of the strongly acidic cation exchange resin include a sulfonic acid group, and the like.

Examples of the exchange group of the weakly acidic cation exchange resin include a carboxy group and a phenolic hydroxyl group.

Examples of the exchange group of the strongly basic anion exchange resin (type I) include a trimethylammonium group.

Examples of the exchange group of the strongly basic anion exchange resin (type II) include a dimethylethanolammonium group.

Examples of the exchange group of the weakly basic anion exchange resin include a tertiary amino group.

As the ion exchange resin, a commercially available product may be used, and examples of the commercially available product include SGC 650 (manufactured by Purolite Corporation), DIAION (trademark) series (manufactured by Mitsubishi Chemical Corporation), Amberlite (trademark), Amberjet (trademark) (manufactured by Organo Corporation), and the like.

[Ion Exchange]

The method of ion exchanging the raw colloidal silica using the ion exchange resin is not particularly limited, and a known method in the related art can be used. Examples of the method include a method of mixing raw colloidal silica and an ion exchange resin, and a method of passing raw colloidal silica through a column packed with an ion exchange resin.

When the raw colloidal silica and the ion exchange resin are mixed, the amount of the ion exchange resin to be used can be appropriately adjusted according to the raw colloidal silica to be used. The amount of the ion exchange resin to be used is, for example, 10 parts by mass or more and 50 parts by mass or less, and preferably 20 parts by mass or more and 30 parts by mass or less relative to 15 parts by mass of the raw colloidal silica (solid content).

The temperature at which the raw colloidal silica and the ion exchange resin are mixed (stirred) is, for example, 10° C. or more and 50° C. or less, and preferably 20° C. or more and 30° C. or less. The time for mixing (stirring) the raw colloidal silica and the ion exchange resin is, for example, 1 hour or more and 30 hours or less, and preferably 10 hours or more and 20 hours or less.

After the ion exchange is completed, the ion exchange resin is separated and removed to obtain the ion-exchanged raw colloidal silica used in the modification step. The method of separating and removing the ion exchange resin is not particularly limited, and for example, the ion exchange resin is naturally precipitated and the supernatant solution is recovered, whereby the ion-exchanged raw colloidal silica can be obtained.

When the raw colloidal silica is allowed to pass through the column packed with the ion exchange resin, the speed (space velocity) of allowing the raw colloidal silica to pass through the column is, for example, 1 or more and 30 or less per hour, and preferably 5 or more and 15 or less per hour. At this time, the temperature of the raw colloidal silica is, for example, 0° C. or more and 50° C. or less, and preferably 10° C. or more and 30° C. or less.

The raw colloidal silica after being passed can be used as the ion-exchanged raw colloidal silica in the modification step.

<Modification Step>

The production method of this aspect includes anionically modifying ion-exchanged raw colloidal silica to obtain anionically modified colloidal silica (modification step). The ion-exchanged raw colloidal silica is used, so that it is possible to suppress generation of impurities and aggregation of silica.

In the modification step, the specific form of the anionically modifying treatment is not particularly limited, and among modifying treatments of colloidal silica known in the related art, a treatment capable of anionically modifying colloidal silica can be appropriately used.

As a preferred embodiment, an example of a method of modifying raw colloidal silica with a sulfonic acid group to obtain anionically modified colloidal silica is described hereinbelow. In this method, the modification step includes: adding a silane coupling agent having a functional group chemically convertible to a sulfonic acid group to the above ion-exchanged raw colloidal silica, and heating a mixture containing the ion-exchanged raw colloidal silica and the silane coupling agent to obtain a reactant (first reaction step); and converting the functional group into a sulfonic acid group by treating the reactant (second reaction step).

(First Reaction Step)

In the first reaction step, a silane coupling agent having a functional group chemically convertible to a sulfonic acid group is added to the above ion-exchanged raw colloidal silica, and the mixture containing the ion-exchanged raw colloidal silica and the silane coupling agent is heated. This gives a reactant (the silane coupling agent having a functional group chemically convertible to a sulfonic acid group is bonded to the surface of each silica particle). As described above, the reason why a silane coupling agent having a functional group different from a sulfonic acid group is reacted with the ion-exchanged raw colloidal silica, and then the functional group is converted to a sulfonic acid group (second reaction step described later) is because in general, it is difficult to stably obtain a silane coupling agent in a form of being replaced with sulfonic acid groups.

Examples of the silane coupling agent having a functional group chemically convertible to a sulfonic acid group include 1) a silane coupling agent having a sulfonic acid ester group convertible to a sulfonic acid group by hydrolysis, and 2) a silane coupling agent having a mercapto group and/or a sulfide group convertible to a sulfonic acid group by oxidation. Since sulfonic acid modification of the surface of the colloidal silica is performed in a solution, it is preferable to use the latter coupling agent having a mercapto group and/or a sulfide group in order to increase the modification efficiency.

Examples of the silane coupling agent having a mercapto group include 3-mercaptopropyltrimethoxysilane, 2-mercaptopropyltriethoxysilane, 2-mercaptoethyltrimethoxysilane, and 2-mercaptoethyltriethoxysilane. Examples of the coupling agent having a sulfide group include bis(3-triethoxysilylpropyl) disulfide.

Further, the silane coupling agent may be hydrolyzed in advance with an acid, and then subjected to a condensation reaction with ion-exchanged raw colloidal silica.

Since the silane coupling agent is hardly dissolved in water, it is preferable to add the silane coupling agent in a solution form. As a solvent of the solution, an organic solvent (hydrophilic solvent) is preferably used for the purpose of dissolving the silane coupling agent. Examples of the organic solvent (hydrophilic solvent) include organic solvents such as methanol, ethanol, and isopropanol. The organic solvent is preferably methanol or ethanol from the viewpoint of low vapor pressure, and more preferably ethanol from the viewpoint of easy handling.

Note that the additive amount of the silane coupling agent used in the first reaction step is not particularly limited, and is preferably 0.5% by mass or more and 10% by mass or less, and more preferably 1% by mass or more and 5% by mass or less relative to 100% by mass of silica particles (solid content) contained in the ion-exchanged raw colloidal silica. When the additive amount of the silane coupling agent is 0.5% by mass or more, the surface of each silica particle can be sufficiently anionized, and excellent performance can be exerted when the silica particles are used as a polishing agent (abrasive grains in the polishing composition). Meanwhile, when the additive amount of the silane coupling agent is 10% by mass or less, it is possible to prevent gelation of the obtained reactant (anionically modified colloidal silica) over time. Further, the amount of the organic solvent (hydrophilic solvent) used to dissolve the silane coupling agent is preferably 300% by vol or more and 3000% by vol or less, and more preferably 400% by vol or more and 2000% by vol or less relative to 100% by vol of the amount of the silane coupling agent.

The temperature at which the silane coupling agent is added is not limited, and is preferably in a range from ambient temperature (about 20° C.) to the boiling point of the reaction solvent. The reaction time is also not limited, and is preferably 10 minutes or more and 30 hours or less, and more preferably 30 minutes or more and 20 hours or less. However, from the viewpoint of terminating the hydrolysis of the coupling agent, the first reaction step is preferably carried out under the condition that the temperature condition of 50° C. or more is continued for 15 hours or more. The pH at the time of addition is not particularly limited.

(Second Reaction Step)

In the second reaction step, the reactant (the silane coupling agent having a functional group chemically convertible to a sulfonic acid group is bonded to the surface of each silica particle) obtained in the first reaction step is treated. As a result, the "functional group chemically convertible to a sulfonic acid group" of the silane coupling agent is converted into a sulfonic acid group.

The specific form of the "treatment" performed to convert the "functional group chemically convertible to a sulfonic acid group" of the silane coupling agent into a sulfonic acid group is not particularly limited, and can be appropriately selected according to the structure of the silane coupling agent to be used. For example, when the silane coupling agent having a sulfonic acid ester group convertible to a sulfonic acid group by hydrolysis, described in 1), is used in the first reaction step, the functional group (sulfonic acid ester group) of the silane coupling agent can be hydrolyzed by subjecting the above reactant to a hydrolysis treatment. As a result, the sulfonic acid ester group is converted into a sulfonic acid group.

Further, when the silane coupling agent having a mercapto group and/or a sulfide group convertible to a sulfonic acid group by oxidation, described in 2), is used in the first reaction step, the functional group (mercapto group and/or sulfide group) of the silane coupling agent can be oxidized by subjecting the above reactant to an oxidation treatment. As a result, the mercapto group or the sulfide group is converted into a sulfonic acid group.

In order to subject the above reactant to an oxidation treatment, for example, the reactant may be reacted with an oxidizing agent. Examples of the oxidizing agent include nitric acid, hydrogen peroxide, oxygen, ozone, organic peracid (percarboxylic acid), bromine, hypochlorite, potassium permanganate, chromic acid, and the like. Among these oxidizing agents, hydrogen peroxide and organic peracid (peracetic acid and perbenzoic acids) are preferable from the viewpoint of relatively easy handling and good oxidation yield. Note that it is most preferable to use hydrogen peroxide in consideration of substances obtained as by-products in the reaction. From the viewpoint of securing the amount necessary for the reaction and reducing the residual oxidizing agent, the additive amount of the oxidizing agent is preferably 3 mol times or more and 5 mol times or less of the silane coupling agent. The additive amount of the oxidizing agent is set to a value within the above range, so that it is possible to minimize the concentration of the residual oxidizing agent in the resulting anionically modified colloidal silica. The specific value of the concentration of the residual oxidizing agent in the resulting anionically modified colloidal silica is not particularly limited, and is preferably 1000 ppm by mass or less, more preferably 700 ppm by mass or less, and particularly preferably 500 ppm by mass or less. Here, in a case in which the concentration of the residual oxidizing agent in the resulting anionically modified colloidal silica exceeds 1000 ppm by mass, when the anionically modified colloidal silica itself or the polishing composition obtained by adding the anionically modified colloidal silica as a polishing agent (abrasive grains) is stored and transported in a state of being enclosed in an airtight container, an oxidizing agent such as hydrogen peroxide may be decomposed to generate gas such as oxygen, and the internal pressure of the container may increase. Meanwhile, as described above, the concentration of the residual oxidizing agent in the resulting anionically modified colloidal silica is reduced, whereby the risk of such an increase in the internal pressure is reduced, and this is preferable. Further, in the case of being used as a polishing composition, there is also an advantage that the occurrence of a problem such as wafer dishing, which can be generated when a large amount of oxidizing agent is contained, can be suppressed. Note that the colloidal silica and the silane coupling agent have a stable structure in the oxidation reaction except for a functional group which is oxidized (converted) to a sulfonic acid group, and thus, no by-products are present.

When the anionically modified colloidal silica obtained according to the above method contains a solvent other than water, a solvent removal step of removing the solvent may be included after the modification step, if necessary. For example, the dispersing medium mainly containing a reaction solvent can be replaced with water, or the solvent can be removed using an evaporator. Note that the water replacement may be performed after the addition of the silane coupling agent and before the addition of the oxidizing agent. The method of replacing a solvent other than water with water is not particularly limited, and examples of the method include a method in which water is added dropwise by a fixed amount while the anionically modified colloidal silica is heated. Further, examples thereof include a method in which the anionically modified colloidal silica is separated from the solvent other than water by precipitation, separation, centrifugation, or the like, and then redispersed in water.

<Polishing Composition>

The anionically modified colloidal silica obtained by the above production method can be used as a polishing agent (abrasive grains) contained in the polishing composition. Therefore, one aspect of the present invention is a polishing composition containing abrasive grains and a dispersing medium, in which the abrasive grains contain the anionically modified colloidal silica obtained by the above production method.

A lower limit of a content of the abrasive grains in the polishing composition of this aspect is preferably 0.01% by mass or more, more preferably 0.05% by mass or more, still more preferably 0.1% by mass or more, and yet still more preferably 1.0% by mass or more. An upper limit of a content of the abrasive grains is preferably 20% by mass or less, more preferably 10% by mass or less, and still more preferably 5% by mass or less.

The dispersing medium preferably contains water. Further, from the viewpoint of preventing the influence of impurities on other ingredients of the polishing composition, it is preferable to use water having the highest possible purity. Specifically, deionized water (ion-exchanged water), pure water, ultrapure water, distilled water, or the like is preferably used. Further, an organic solvent or the like may be further contained as the dispersing medium for the purpose of controlling the dispersibility of other ingredients of the polishing composition, and the like.

The polishing composition of this aspect may further contain known additives such as pH adjusting agents, chelating agents, thickeners, oxidizing agents, dispersants, surface protectants, wetting agents, surfactants, antirust agents, antiseptic agents, and antifungal agents, if necessary. The content of the additives may be appropriately set according to the purpose of addition.

As the pH adjusting agents, known acids, bases other than basic inorganic compounds, or salts thereof can be used. Specific examples of the acid that can be used as the pH adjusting agent include inorganic acids such as hydrochloric acid, sulfuric acid, hydrofluoric acid, boric acid, carbonic acid, hypophosphorous acid, phosphorus acid, and phosphoric acid; and organic acids such as formic acid, acetic acid, propionic acid, butyric acid, valeric acid, 2-methylbutyric acid, n-hexanoic acid, 3,3-dimethylbutyric acid, 2-ethylbutyric acid, 4-methylpentanoic acid, n-heptanoic acid, 2-methylhexanoic acid, n-octanoic acid, 2-ethylhexanoic acid, benzoic acid, glycolic acid, salicylic acid, glyceric acid, oxalic acid, malonic acid, succinic acid, glutaric acid, adipic acid, pimelic acid, maleic acid, phthalic acid, malic acid, tartaric acid, citric acid, lactic acid, diglycolic acid, 2-furancarboxylic acid, 2,5-furandicarboxylic acid, 3-furancarboxylic acid, 2-tetrahydrofurancarboxylic acid, methoxyacetic acid, methoxyphenylacetic acid, and phenoxyacetic acid.

Examples of the bases other than basic inorganic compounds that can be used as the pH adjusting agents include aliphatic amines such as ethanolamine and 2-amino-2-ethyl-1,3-propanediol, aromatic amines, basic organic compounds such as quaternary ammonium hydroxide, ammonia, and the like.

The pH adjusting agents may be used singly or in combination of two or more kinds thereof.

The additive amount of the pH adjusting agent is not particularly limited, and may be appropriately adjusted so that the pH of the polishing composition falls within a desired range.

An upper limit of the pH of the polishing composition of this aspect is preferably 5.0 or less, more preferably 4.0 or less, and still more preferably 3.0 or less. A lower limit of the pH of the polishing composition is not particularly limited, and is preferably 1.5 or more.

The method of producing the polishing composition of this aspect is not particularly limited, and for example, the polishing composition can be obtained by stirring and mixing abrasive grains and, if necessary, additives in a dispersing medium. The temperature at which respective ingredients are mixed is not particularly limited, and is preferably 10° C. or more and 40° C. or less, and heating may be performed to increase the rate of dissolution. Further, the mixing time is also not particularly limited.

<Polishing Method>

One aspect of the present invention is a polishing method for polishing an object to be polished using the above polishing composition.

The object to be polished contains silicon nitride and silicon oxide. Examples of the film containing silicon oxide include a TEOS (tetraethyl orthosilicate) type silicon oxide film (hereinafter, also simply referred to as "TEOS film") produced using tetraethyl orthosilicate as a precursor, a HDP (high density plasma) film, a USG (undoped silicate glass) film, a PSG (phosphorus silicate glass) film, a BPSG (boron-phospho silicate glass) film, a RTO (rapid thermal oxidation) film, and the like.

The object to be polished may contain other materials, in addition to silicon nitride and silicon oxide. Examples of other materials include silicon carbonitride, polysilicon, titanium nitride, tungsten, and the like.

As the polishing machine, it is possible to use a general polishing machine to which a holder for holding a substrate having the object to be polished, and the like, a motor capable of changing the rotation speed, and the like are attached, and which has a polishing table to which a polishing pad (polishing cloth) can be attached.

As the polishing pad, a general non-woven fabric, polyurethane, a porous fluororesin, and the like can be used without particular limitation. The polishing pad is preferably subjected to grooving such that the polishing composition is accumulated.

The polishing conditions are also not particularly limited, and for example, the rotation speed of the polishing table is preferably 10 rpm or more and 500 rpm or less, the rotation speed of the carrier is preferably rpm or more and 500 rpm or less, and the pressure (polishing pressure) applied to the substrate having the object to be polished is preferably 0.1 psi or more and psi or less. The method of supplying the polishing composition to the polishing pad is not particularly limited, and for example, a method of continuously supplying the polishing composition by a pump or the like is employed. This supply amount is not limited, and it is preferable that the surface of the polishing pad is always covered with the polishing composition of the present invention.

EXAMPLES

The present invention is described in more detail with reference to the following Examples and Comparative Examples. However, the technical scope of the present invention is not limited to the following Examples. Note that, unless otherwise indicated, "%" and "parts" refer to "% by mass" and "parts by mass", respectively. Further, in the following Examples, unless otherwise indicated, operations were carried out under conditions of at room temperature (of 20 to 25° C.) and relative humidity of 40 to 50% RH.

Example 1

1 kg of aluminic acid-modified colloidal silica (concentration of silica particles: 15% by mass, average primary particle size: 12 nm, average secondary particle size: 54 nm, average degree of association: 4.5) produced by the sodium silicate method and 200 mL of ion exchange resin (strongly acidic cation exchange resin; SGC 650, manufactured by Purolite Corporation) were mixed and stirred for 18 hours to perform ion exchange. After the ion exchange was completed, the ion exchange resin was naturally precipitated to recover a supernatant solution (ion-exchanged colloidal silica).

5 mL of 3-mercaptopropyltrimethoxysilane mixed with mL of ethanol was added to 900 mL of the ion-exchanged colloidal silica, and the mixture was heated at 70° C. for 18 hours. Thereafter, 80 mL of 31% by mass of hydrogen peroxide solution was added thereto, and the mixture was heated at 65° C. for 18 hours. After heating, ethanol was removed using an evaporator to prepare anionically modified colloidal silica.

Example 2

Anionically modified colloidal silica was prepared in a similar manner to Example 1 except that the additive amount of 3-mercaptopropyltrimethoxysilane was 4 mL.

Example 3

Anionically modified colloidal silica was prepared in a similar manner to Example 1 except that ethanol was not removed using the evaporator.

Example 4

Anionically modified colloidal silica was prepared in a similar manner to Example 1 except that the additive amount of 3-mercaptopropyltrimethoxysilane was 3 mL.

Example 5

Anionically modified colloidal silica was prepared in a similar manner to Example 1 except that the additive amount of 3-mercaptopropyltrimethoxysilane was 2 mL.

Example 6

Anionically modified colloidal silica was prepared in a similar manner to Example 1 except that the additive amount of 3-mercaptopropyltrimethoxysilane was 1 mL.

Example 7

1 kg of aluminic acid-modified colloidal silica (concentration of silica particles: 15% by mass, average primary particle size: 12 nm, average secondary particle size: 54 nm, average degree of association: 4.5) produced by the sodium silicate method was ion-exchanged with 200 mL of ion exchange resin for 18 hours.

To 900 mL of the ion-exchanged colloidal silica, 20 mL of methanol and 5 mL of 3-mercaptopropyltrimethoxysilane were added, and the mixture was heated at 60° C. for 18 hours. Thereafter, 80 mL of 31% by mass of hydrogen peroxide solution was added thereto, and the mixture was heated at 65° C. for 18 hours. After heating, methanol was removed using the evaporator to prepare anionically modified colloidal silica.

Comparative Example 1

1 kg of aluminic acid-modified colloidal silica (concentration of silica particles: 15% by mass, average primary particle size: 12 nm, average secondary particle size: 54 nm, average degree of association: 4.5) produced by the sodium silicate method was ion-exchanged with 200 mL of ion exchange resin for 18 hours to prepare colloidal silica of Comparative Example 1.

Comparative Example 2

1 kg of aluminic acid-modified colloidal silica (concentration of silica particles: 15% by mass, average primary particle size: 12 nm, average secondary particle size: 54 nm, average degree of association: 4.5) produced by the sodium silicate method was ion-exchanged with 200 mL of ion exchange resin for 18 hours.

4 mL of 3-mercaptopropyltrimethoxysilane mixed with 20 mL of ethanol was added to 900 mL of the ion-exchanged colloidal silica, and the mixture was heated at 70° C. for 18 hours to prepare colloidal silica of Comparative Example 2.

Comparative Example 3

1 kg of aluminic acid-modified colloidal silica (concentration of silica particles: 15% by mass, average primary particle size: 12 nm, average secondary particle size: 54 nm, average degree of association: 4.5) produced by the sodium silicate method was ion-exchanged with 200 mL of ion exchange resin for 18 hours.

To 920 mL of the ion-exchanged colloidal silica, 80 mL of 31% by mass of hydrogen peroxide solution was added, and the mixture was heated at 65° C. for 18 hours. Ethanol was removed using the evaporator to prepare colloidal silica of Comparative Example 3.

Comparative Example 4

4 mL of 3-mercaptopropyltrimethoxysilane mixed with 20 mL of ethanol was added to 900 mL of aluminic acid-modified colloidal silica (concentration of silica particles: 15% by mass, average primary particle size: 12 nm, average secondary particle size: 54 nm, average degree of association: 4.5) produced by the sodium silicate method, and the mixture was heated at 70° C. for 18 hours. Thereafter, 80 mL of 31% by mass of hydrogen peroxide solution was added thereto, and the mixture was heated at 65° C. for 18 hours. Ethanol was removed using the evaporator to prepare colloidal silica of Comparative Example 4.

Comparative Example 5

1 kg of colloidal silica (concentration of silica particles: 20% by mass, average primary particle size: 35 nm, average secondary particle size: 69 nm, average degree of association: 2.0) produced by the sol-gel method and 200 mL of ion exchange resin (strongly acidic cation exchange resin; SGC 650, manufactured by Purolite Corporation) were mixed and stirred for 18 hours to perform ion exchange. After the ion exchange was completed, the ion exchange resin was naturally precipitated to recover a supernatant solution (ion-exchanged colloidal silica).

5 mL of 3-mercaptopropyltrimethoxysilane mixed with mL of ethanol was added to 900 mL of the ion-exchanged colloidal silica, and the mixture was heated at 70° C. for 18 hours. Thereafter, 80 mL of 31% by mass of hydrogen peroxide solution was added thereto, and the mixture was heated at 65° C. for 18 hours. After the heating, ethanol was removed using the evaporator to prepare colloidal silica of Comparative Example 5.

[Evaluation]

<Evaluation of Average Secondary Particle Size>

The average secondary particle size of the anionically modified colloidal silica prepared in Example 2 and the colloidal silica prepared in Comparative Example 4 was measured by a light scattering method using laser light. As a measuring device, a dynamic light scattering particle size distribution analyzer; UPA-UT 151, manufactured by Nikkiso Co., Ltd. was used.

The average secondary particle size of the anionically modified colloidal silica prepared in Example 2 was 54 nm. The average secondary particle size of the colloidal silica prepared in Comparative Example 4 was 80 nm.

Therefore, it is found that aggregation of silica particles can be suppressed by performing ion exchange.

<Evaluation of Polishing Speed>

(Preparation of Polishing Composition)

Ion-exchanged water was added to the anionically modified colloidal silica of Examples 1 to 7 obtained as described above, the colloidal silica of Comparative Examples 1 to 5 obtained as described above, or the colloidal silica of Comparative Example 6 (aluminic acid-modified colloidal silica produced by the silicate soda method (concentration of silica particles: 15% by mass, average primary particle size: 54 nm, average degree of association: 4.5) so that the concentration of silica particles was 4% by mass, thereby obtaining a mixed liquid. Thereafter, maleic acid was added to the mixed liquid so that the pH was 2.0, thereby preparing polishing compositions 1 to 13.

The pH of the polishing composition (liquid temperature: 25° C.) was confirmed with a pH meter (manufactured by HORIBA, Ltd., model number: LAQUA).

(Measurement of Zeta Potential)

The polishing compositions 1 to 13 prepared above were applied to ELS-Z2, manufactured by Otsuka Electronics Co., Ltd., and measurement was performed by a laser Doppler method (electrophoretic light scattering analysis method) using a flow cell at a measurement temperature of 25° C. The zeta potential of the colloidal silica contained in the polishing composition was calculated by analyzing the obtained data using the Smoluchowski equation. The results are shown in Table 1.

(Evaluation of Polishing Speed)

As objects to be polished, a 200 mm wafer (SiN (silicon nitride film)); and a 200 mm wafer (TEOS (silicon oxide film)), were prepared, each of the wafers was polished using the polishing compositions obtained above under the following polishing conditions, and the polishing speed was measured. Further, the selected ratio was calculated.

[Polishing Conditions]

Polishing machine: CMP single-sided polishing machine for 200-mm wafers;

Polishing pad: pad made of polyurethane (IC 1010: manufactured by Rohm and Haas Company);

Pressure: 4.0 psi (about 27.6 kPa);

Platen (table) rotation speed: 90 rpm;

Head (carrier) rotation speed: 87 rpm;

Flow rate of polishing composition: 200 ml/min; and

Polishing time: 1 minute.

[Polishing Speed]

The polishing speed (polishing rate) was calculated using the following formula.

[Equation 1]

$$\text{Polishing rate } [\text{Å/min}] = \frac{\text{Film thickness before polishing } [\text{Å}] - \text{Film thickness after polishing } [\text{Å}]}{(\text{Polishing time } [\text{min}])}$$

The film thickness was determined by a light interference type film thickness measurement apparatus (manufactured by KLA Corporation, model number: ASET), and evaluated by dividing the difference by the polishing time. The results are shown in Table 1.

TABLE 1

|  | Colloidal silica | pH | Zeta potential (pH 2.0) | Polishing speed (Å/min) SiN | Polishing speed (Å/min) TEOS | Selected ratio SiN/TEOS |
|---|---|---|---|---|---|---|
| Polishing composition 1 | Example 1 | 2.0 | −43 mV | 795 | 39 | 20 |
| Polishing composition 2 | Example 2 | 2.0 | −40 mV | 797 | 38 | 21 |
| Polishing composition 3 | Example 3 | 2.0 | −40 mV | 797 | 39 | 20 |
| Polishing composition 4 | Example 4 | 2.0 | −35 mV | 790 | 43 | 18 |

TABLE 1-continued

| | Colloidal silica | pH | Zeta potential (pH 2.0) | Polishing speed (Å/min) SiN | Polishing speed (Å/min) TEOS | Selected ratio SiN/TEOS |
|---|---|---|---|---|---|---|
| Polishing composition 5 | Example 5 | 2.0 | −30 mV | 773 | 55 | 14 |
| Polishing composition 6 | Example 6 | 2.0 | −25 mV | 755 | 60 | 13 |
| Polishing composition 7 | Example 7 | 2.0 | −25 mV | 753 | 60 | 13 |
| Polishing composition 8 | Comparative Example 1 | 2.0 | −18 mV | 765 | 88 | 9 |
| Polishing composition 9 | Comparative Example 2 | 2.0 | −3 mV | 100 | 20 | 5 |
| Polishing composition 10 | Comparative Example 3 | 2.0 | −15 mV | 766 | 63 | 12 |
| Polishing composition 11 | Comparative Example 4 | 2.0 | −25 mV | 735 | 120 | 6 |
| Polishing composition 12 | Comparative Example 5 | 2.0 | −45 mV | 690 | 120 | 6 |
| Polishing composition 13 | Comparative Example 6 | 2.0 | −15 mV | 730 | 95 | 8 |

As shown in Table 1, it is found that when the anionically modified colloidal silica of the examples is used, the silicon nitride film can be polished at a high speed and the polishing speed of the silicon oxide film can be suppressed as compared with the colloidal silica of the comparative examples.

The present application is based on JP 2020-098159 filed on Jun. 5, 2020, the disclosure of which is incorporated herein by reference in its entirety.

What is claimed is:

1. A method of producing anionically modified colloidal silica, comprising:
   ion exchanging raw colloidal silica using an ion exchange resin; and
   anionically modifying the ion-exchanged raw colloidal silica to obtain anionically modified colloidal silica, wherein the anionically modifying includes:
   dissolving a silane coupling agent in an organic solvent,
   adding the silane coupling agent having a functional group chemically convertible to a sulfonic acid group in a solution form to the ion-exchanged raw colloidal silica,
   heating a mixture containing the ion-exchanged raw colloidal silica and the silane coupling agent to obtain a reactant; and
   converting the functional group into a sulfonic acid group by treating the reactant,
   wherein the organic solvent used to dissolve the silane coupling agent is present an amount of 300% by volume or more and 3000% by volume or less, and
   wherein the raw colloidal silica is obtained by a sodium silicate method in which active silicic acid, obtained by ion exchange of an aqueous silicate solution, is subject to particle growth.

2. The production method according to claim 1, further comprising removing the solvent after the anionically modifying.

* * * * *